(12) United States Patent
Edwards (10) Patent No.: US 6,619,022 B2
(45) Date of Patent: Sep. 16, 2003

(54) ARTICLE RETRIEVING DEVICE FOR HARVESTING NUTS

(75) Inventor: Benny Kay Edwards, Bakersfield, MO (US)

(73) Assignee: Danny D. Hayes, Bakersfield, MO (US)

(*) Notice: Subject to any disclaimer, the term of this patent is extended or adjusted under 35 U.S.C. 154(b) by 0 days.

(21) Appl. No.: 09/860,581

(22) Filed: May 21, 2001

(65) Prior Publication Data

US 2002/0170282 A1 Nov. 21, 2002

(51) Int. Cl.[7] ................ A01D 46/00; A63B 47/02
(52) U.S. Cl. .................... 56/328.1; 294/19.2
(58) Field of Search ................ 56/327.1, 328.1, 56/332; 294/19.1, 19.2, 30.7

(56) References Cited

U.S. PATENT DOCUMENTS

| | | | |
|---|---|---|---|
| 2,810,252 A | * 10/1957 | Kelly | 294/19.2 |
| 3,026,666 A | * 3/1962 | Baugh, Jr. | 294/19.2 |
| 3,600,029 A | * 8/1971 | Nagel | 294/19.2 |
| 3,604,190 A | * 9/1971 | Wray | 294/19.2 |
| 3,984,138 A | * 10/1976 | Brunner et al. | 294/19.2 |
| D263,917 S | 4/1982 | McCulley | |
| 4,499,713 A | 2/1985 | Stone | |
| 4,593,519 A | 6/1986 | Kimball | |
| 4,629,235 A | * 12/1986 | Logue | 221/306 |
| 4,964,665 A | * 10/1990 | Crow | 294/19.2 |
| 5,025,620 A | 6/1991 | Dudley | |
| 5,188,410 A | * 2/1993 | Summers | 294/19.2 |
| 5,287,687 A | 2/1994 | Urich et al. | |
| 5,360,247 A | * 11/1994 | Vachter | 294/1.4 |
| 5,421,147 A | 6/1995 | Holden et al. | |
| 5,465,562 A | 11/1995 | Croft | |
| 5,505,510 A | * 4/1996 | Duncan | 294/19.2 |
| 5,592,805 A | 1/1997 | Croft | |
| 5,667,264 A | * 9/1997 | Tanahara | 15/257.6 |
| 6,044,638 A | 4/2000 | Young | |

FOREIGN PATENT DOCUMENTS

FR 2766659 * 2/1999

* cited by examiner

Primary Examiner—Robert E. Pezzuto
Assistant Examiner—Nathan Mammen
(74) Attorney, Agent, or Firm—Boyd D. Cox (57) ABSTRACT

An article retrieving device for gathering and storing nuts that allows the user to maintain an erect posture during use, comprises a retaining element and a housing. The retaining element is adapted to retrieve nuts from the ground and includes a plurality of resilient pieces arranged in rows on a sleeve. The retrieved nuts are stored in the housing and dispensed from the housing via a dispensing opening.

18 Claims, 5 Drawing Sheets

ARTICLE RETRIEVING DEVICE FOR HARVESTING NUTS

BACKGROUND

The present invention is directed to an article retrieving device for gathering, storing and dispensing nuts. The article retrieving device has a retaining element for collecting the nuts from the ground and a housing for storing the nuts that have been collected. In use, a nut enters the retaining element at one end of the device and is pushed by subsequently retrieved nuts through a deformable passageway in the retaining element and into the housing where the nuts accumulate for storage purposes. The accumulated nuts can be dispensed from the housing when desired.

Nuts are typically harvested after they have fallen from the trees onto the ground. Retrieving the nuts from the ground can require a person to repeatedly bend and/or stoop in order to pick up each of the nuts. Consequently, harvesting nuts can be an arduous and time consuming task.

When retrieving nuts, a harvester will often carry with him a container in which to store the nuts he has gathered. Typically, the container is carried in one hand while the nuts are gathered and placed in the container with the other hand. Since a container can be bulky and cumbersome to carry, especially when bending and stooping, the harvesting task is made even more difficult.

Some nut harvesters choose to place their collecting container in a central location and walk back and forth to deposit the retrieved nuts into the container. This not only frees both hands for picking up the nuts, but also relieves him from having to carry the container as he moves from place to place gathering nuts. However, he must return frequently to the central container when his hands are full in order to deposit the nuts in the container. Such an exercise can require a substantial amount of walking, particularly when the nuts are scattered over a large area of ground, thereby increasing the time and effort required to gather the nuts.

Various known article retrievers allow the user to remain erect while gathering the nuts from the ground. However, these retrievers have certain drawbacks. With wire retrievers, the wires that pick up the nuts are distended through normal use when both picking up and releasing the nuts from the device. The distance between the wires is critical in order for the retrievers to work effectively. After prolonged use, the distance between the wires can be permanently altered to thereby render the device ineffective for retrieving nuts.

Other wire retrievers are capable of picking up and storing the nuts. However, during the retrieval process, there is a tendency for the stored nuts to escape from the storage area and drop back onto the ground. As the quantity of nuts in the storage area increases, the tendency of the nuts to escape increases significantly, so the storage area must be emptied before it is full. Therefore, the storage capacity of these retrievers is limited.

Some nut retrieving devices pick up unwanted debris, particularly leaves and twigs that may be surrounding the nuts on the ground. As a result it is generally necessary to separate the nuts from the debris after retrieval, thereby increasing frustration and time needed for completing the task.

With tube retrievers, the retrieved articles are able to back out of the entryway of these devices. To deter the retrieved articles from backing out of the device's entryway, one-way trap doors have been added inside the device. The trap doors allow the articles into the device, but block their exit through the entryway. While trap doors may effectively inhibit the retrieved articles from exiting back through the entryway, the manufacturing cost of the device is significantly increased as a result.

Therefore, there is a need for an inexpensive article retrieving device that allows the user to remain in an erect standing/walking position during use and that can store a quantity of nuts during the retrieval process. In addition, the need exists for a retrieving device with a retaining element having an entryway that inhibits the stored articles from backing out of the device, and that can deter the collection of debris while retrieving articles.

SUMMARY

The present invention is directed to an article retrieving device that satisfies the need for gathering nuts that are dispersed on the ground, while allowing the user to maintain an erect position. In addition to retrieving nuts, the device holds the nuts in a storage area after they have been retrieved, and dispenses the stored nuts as desired.

In a preferred embodiment of the present invention, the article retrieving device includes a retaining element for retrieving the nuts and a housing for storing and dispensing the retrieved nuts. The retaining element includes a sleeve with a means for gripping an article. The means for gripping an article is a flexible member comprised by a plurality of resilient pieces which are arranged in rows on the sleeve. Inside the sleeve, the rows of resilient pieces form a deformable passageway. To retrieve, each nut is pressed into and held by the deformable passageway. As additional nuts are retrieved, the nut(s) in the passageway are pushed linearly through the passageway by force of additional nuts moving into the passageway. The nuts move from the passageway into the housing where they can be stored. With the device in a dispensing position the stored nuts can be emptied from the housing via the dispensing opening by the force of gravity.

It is an object of the present invention to provide an article retrieving device that harvests nuts from the ground.

It is a further object of the present invention to provide a device for gathering nuts wherein the user can maintain an erect posture while retrieving nuts.

It is a further object of the present invention to provide an article retrieving device that can store a substantial quantity of nuts during the retrieval process.

It is a further object of the present invention to provide an article retrieving device that inhibits the stored articles from backing out of the device's entryway.

It is a further object of the present invention to provide an article retrieving device with a flexible member for retaining the retrieved articles in a storage area on the device.

It is a further object of the present invention to provide an article retrieving device with a flexible member that encircles and grips the outside of the article after entering the device.

It is a further object of the present invention to provide an article retrieving device with a flexible member that forms an elongated passageway for holding the retrieved article.

It is a further object of the present invention to provide an article retrieving device that can collect nuts without collecting substantial amounts of unwanted debris in the process.

It is a further object of the present invention to provide an article retrieving device having a flexible member that is deformable to generally accommodate the shape of the article retrieved.

It is a further object of the present invention to provide an article retrieving device having a deformable passageway for receiving the article into the device.

It is a further object of the present invention to provide a device that will retrieve, retain and dispense nuts.

It is a further object of the present invention to provide a device that will retrieve, store and dispense articles and that allows the user to maintain an erect posture while using the device.

It is a further object of the present invention to provide an article retrieving device that maintains its storage retention capability as the storage area fills with articles.

It is a further object of the present invention to provide a retrieving device that can effectively pick up articles having slight variations in the size of each article.

BRIEF DESCRIPTION OF DRAWINGS

Reference is made to the accompanying drawings in which are shown illustrative embodiments of the invention and from which novel features and advantages will be apparent.

DETAILED DESCRIPTION

Figure 1:
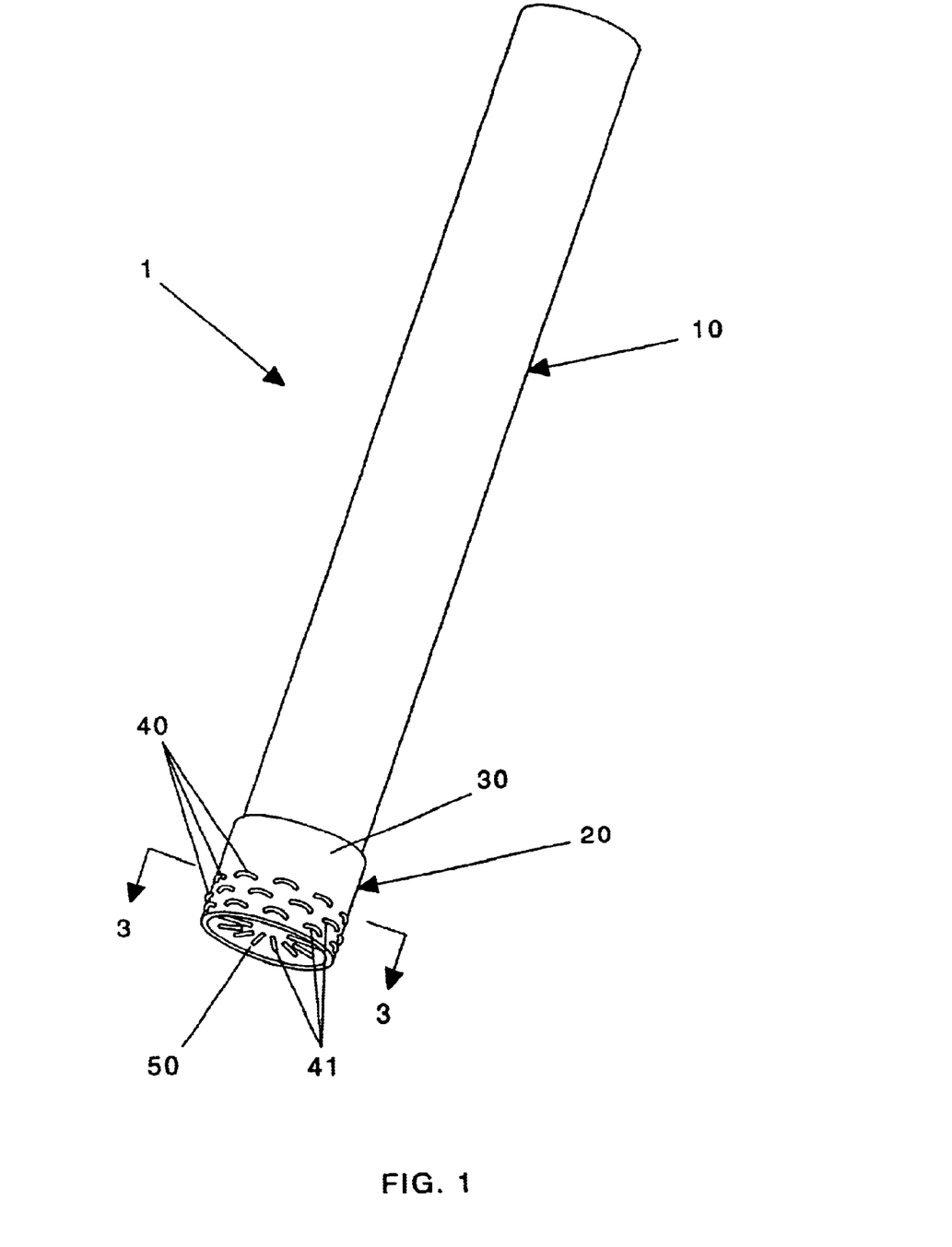
FIG. 1 is a perspective view of a preferred embodiment of the article retrieving device of the present invention.

Referring to FIG. 1, the article retrieving device (1) of the present invention comprises means for storing the articles that are retrieved and a retaining element (20). The means for storing is a housing (10). The retaining element (20) is formed by a sleeve (30) and means for gripping an article. The means for gripping an article is a flexible member (40) comprised of a plurality of resilient pieces (41) which define a deformable passageway (50). The article retrieving device (1) further comprises a retrieving position and a dispensing position.

Figure 2:
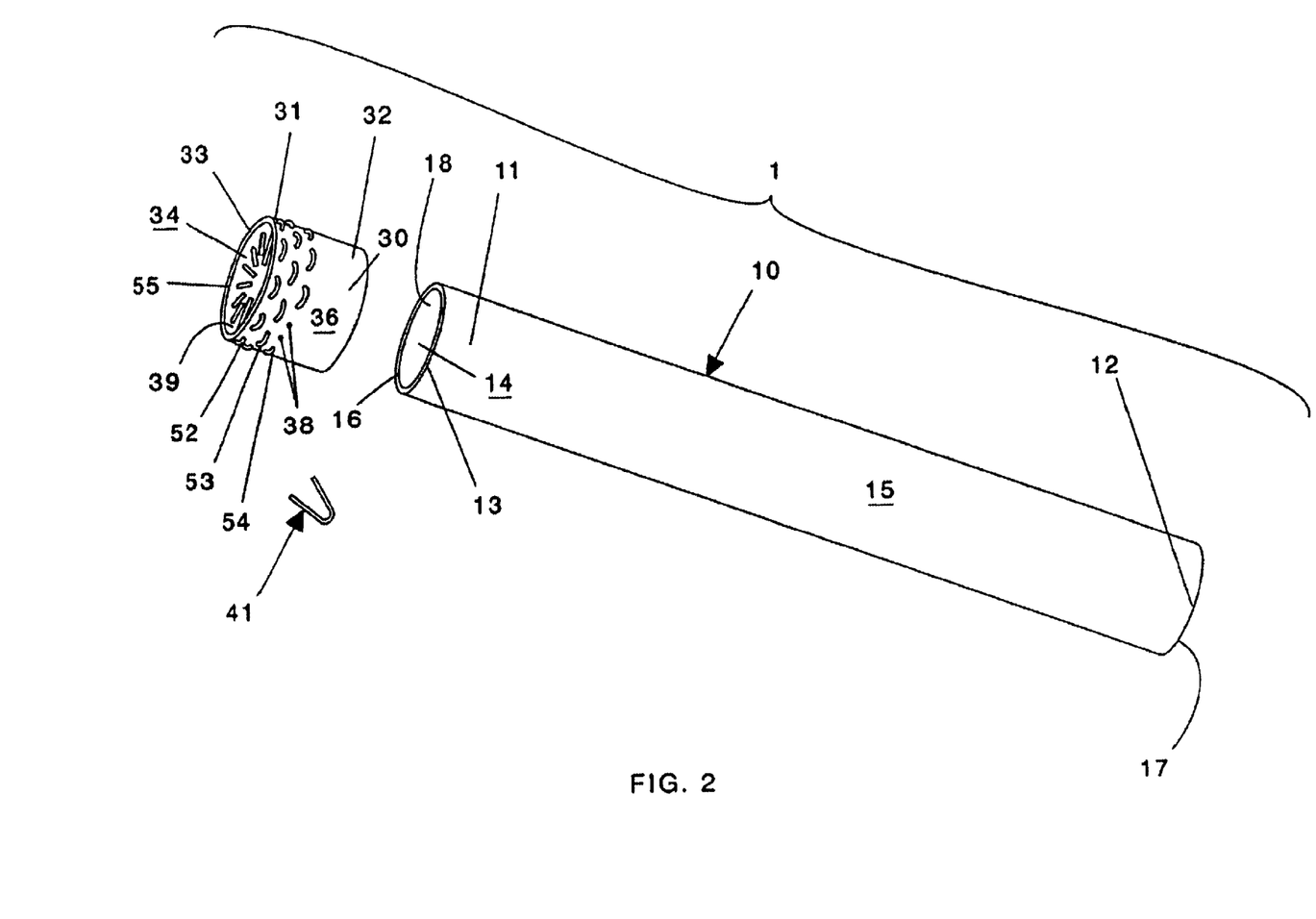
FIG. 2 is a partially exploded side view of the embodiment of FIG. 1.

The housing (10) has first (11) and second (12) housing ends as shown in FIG. 2, and is comprised of a housing wall (13) with an interior surface (14) and an exterior surface (15). The housing wall (13) circumscribes a housing interior area (18). Means for accessing the housing interior area (18) includes a housing entry opening (16) and a dispensing opening (17).

Figure 3:
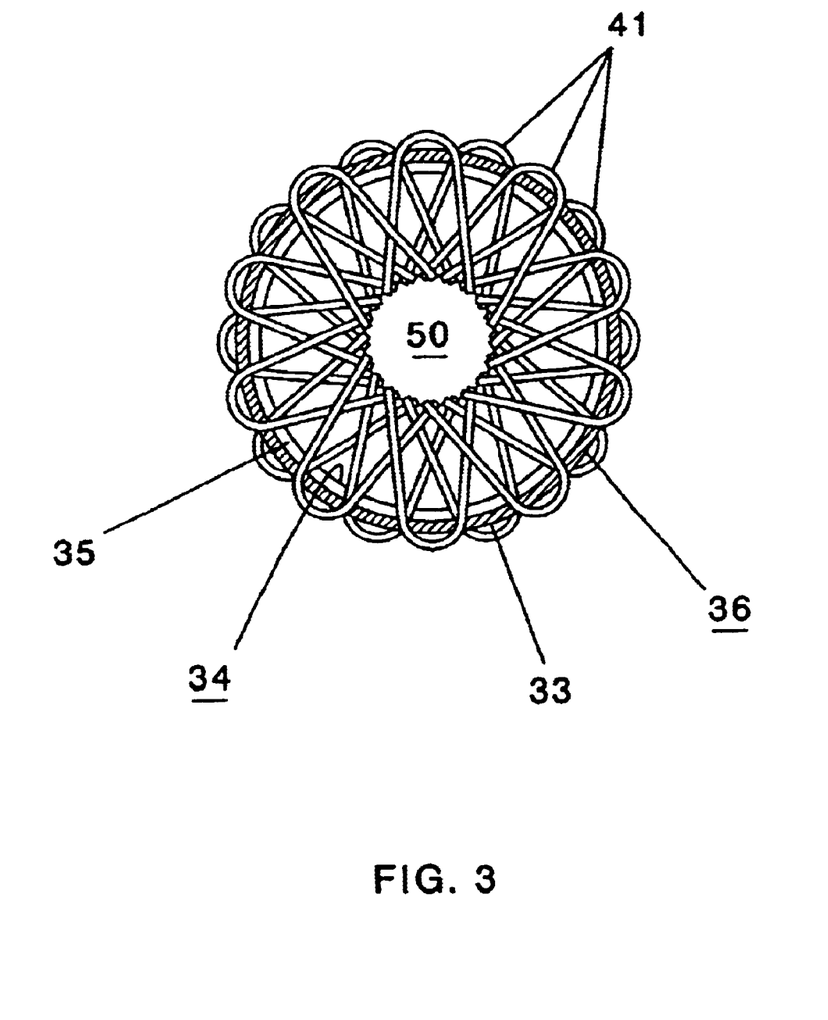
FIG. 3 is a cross sectional view of the embodiment of FIG. 1 taken along line 3—3.

The sleeve (30) is formed by a sleeve wall (33) with inner (34) and outer (36) surfaces, and first (31) and second (32) sleeve ends. The sleeve wall (33) encircles an area comprising the sleeve interior region (39). A lip (35), as shown in FIG. 3, protrudes out from the inner surface (34) of the sleeve wall (33). Extending through the sleeve wall are a plurality of holes (38).

Referring back to FIG. 2, the resilient pieces (41) are arranged in a plurality of rows on the sleeve (30). In a preferred embodiment, the rows of resilient pieces (41) include an outside row (52), a middle row (53), and an inside row (54). Each of the resilient pieces (41) is comprised by a pair of legs (42) adjoined at a central portion (43) shown in FIGS. 5A and 5B. Each leg (42) has a free end (44). Instead of a pair of legs, each resilient piece could comprise a single leg having a free end and one end that is attached to the sleeve wall.

In a preferred embodiment shown in FIG. 2, the housing (10) is an elongated tubular member having a circular cross section. Both the dispensing opening (17) and the housing entry opening (16) conform to the cross sectional shape of the housing (10) and are therefore circular in shape. Like the housing (10), the sleeve (30) is tubular in shape with a circular cross section.

While the cross sectional shape of the housing (10) and sleeve (30) is shown in a preferred embodiment to be circular, it could have an alternate shape. It is preferred, however, that the general cross sectional shapes of the housing (10) and sleeve (30) be the same.

Figure 5A:
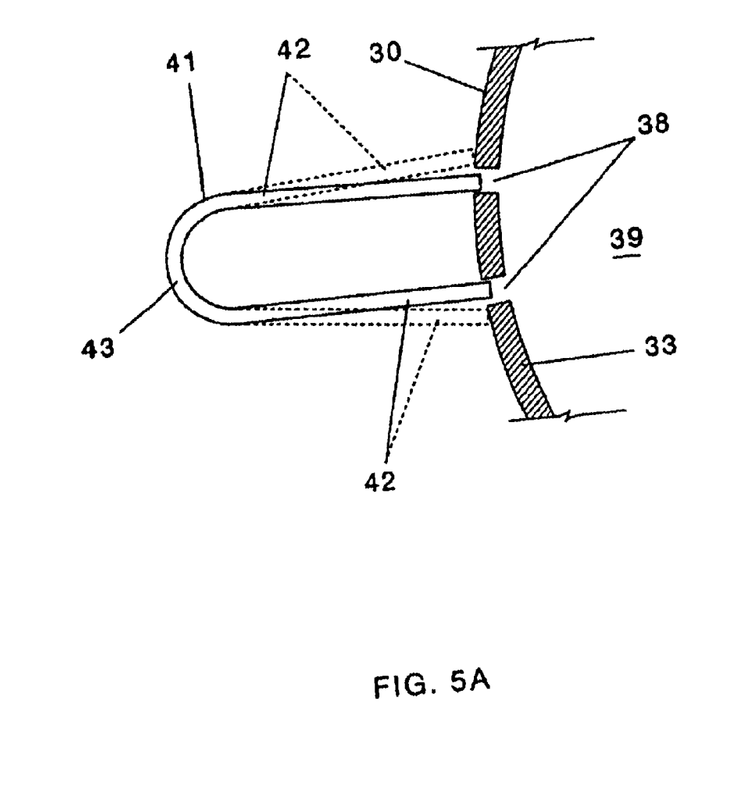
FIG. 5A is a top view of the resilient piece and a cutaway section of the sleeve showing the holes of the embodiment of FIG. 1. The solid lines show the resilient piece flexed to fit into the holes of the sleeve during assembly, while the dotted lines indicate the resilient piece in an unflexed state before insertion through the holes in the sleeve.
Figure 5B:
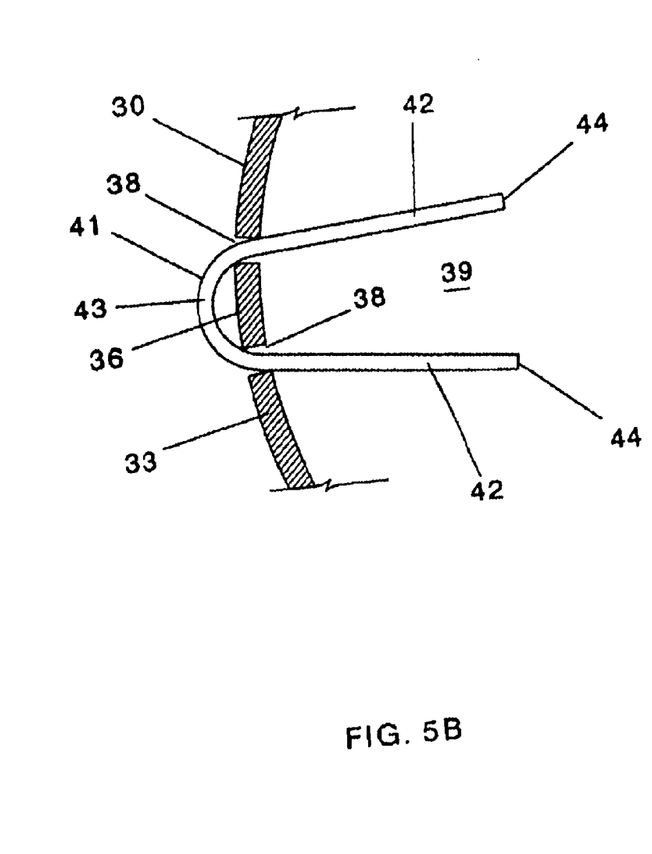
FIG. 5B is a top view of the resilient piece of FIG. 5A in an unflexed state installed in the holes on the sleeve of the present invention.

Each resilient piece (41) in the preferred embodiment of FIG. 5B is generally U-shaped with the legs (42) extending away from the central portion (43). When unflexed, the legs (42) of each resilient piece (41) are generally nonparallel to each other.

The article retrieving device (1) of the present invention is preferably made of plastic. In one preferred embodiment, the housing (10) and the sleeve (30) are made from polyvinylchloride tubing, commonly known as PVC pipe, while a stiff, yet flexible plastic cording comprises the resilient pieces (41).

In lieu of plastic cording, other suitable material having the resilience to flex and return to its original position could be used to make the resilient pieces (41). Such material includes natural fiber and metal bristles. In addition, other materials could be used instead of plastic to comprise the housing (10) and sleeve (30), including fiberglass or lightweight metals such as aluminum or aluminum alloys.

On the retaining element (20), the first end (31) of the sleeve (30) includes an entryway (55) through which the nuts enter the device (1). The flexible member (40) retrieves the nuts from the ground and also deters the nuts stored in the housing (10) from backing out of the entryway (55) once inside the device (1). The legs (42) of the flexible member (40) flex around each nut entering the device (1) and grip the nut to hold it in the passageway (50). The free ends (44) of the legs (42) define the perimeter of the passageway (50). Consequently, the free ends (44) contact the outside surfaces of the nuts held within the passageway (50).

The lip (35) on the sleeve's inner surface (34) is adjacent to the outer edge of the housing (10) to limit sliding movement of the housing (10) into the sleeve (30). This is particularly useful for aligning the housing (10) and sleeve (30) during assembly and for maintaining alignment during use.

In a preferred embodiment, an adhesive is used to affix the sleeve (30) to the housing (10). However, other securing means could be used in lieu of, or in addition to the adhesive in order to attach the sleeve and housing together. Other securing means could include friction fittings, threaded fittings, clamps and detents.

The housing (10) temporarily holds and stores the nuts that have been collected into the device (1). During use, the nuts pass from the retaining element (20) into the housing (10) via the housing entry opening (16) which is disposed at the housing's first end (11). The nuts are removed from the housing (10) through the dispensing opening (17) which is disposed at the second end (12) of the housing (10) opposite the first end (11). The exterior surface (15) of the housing (10) is the primary engagement surface for holding the device (1) when retrieving and dispensing nuts. A user grips the exterior surface (15) to manipulate the device (1).

Figure 4:
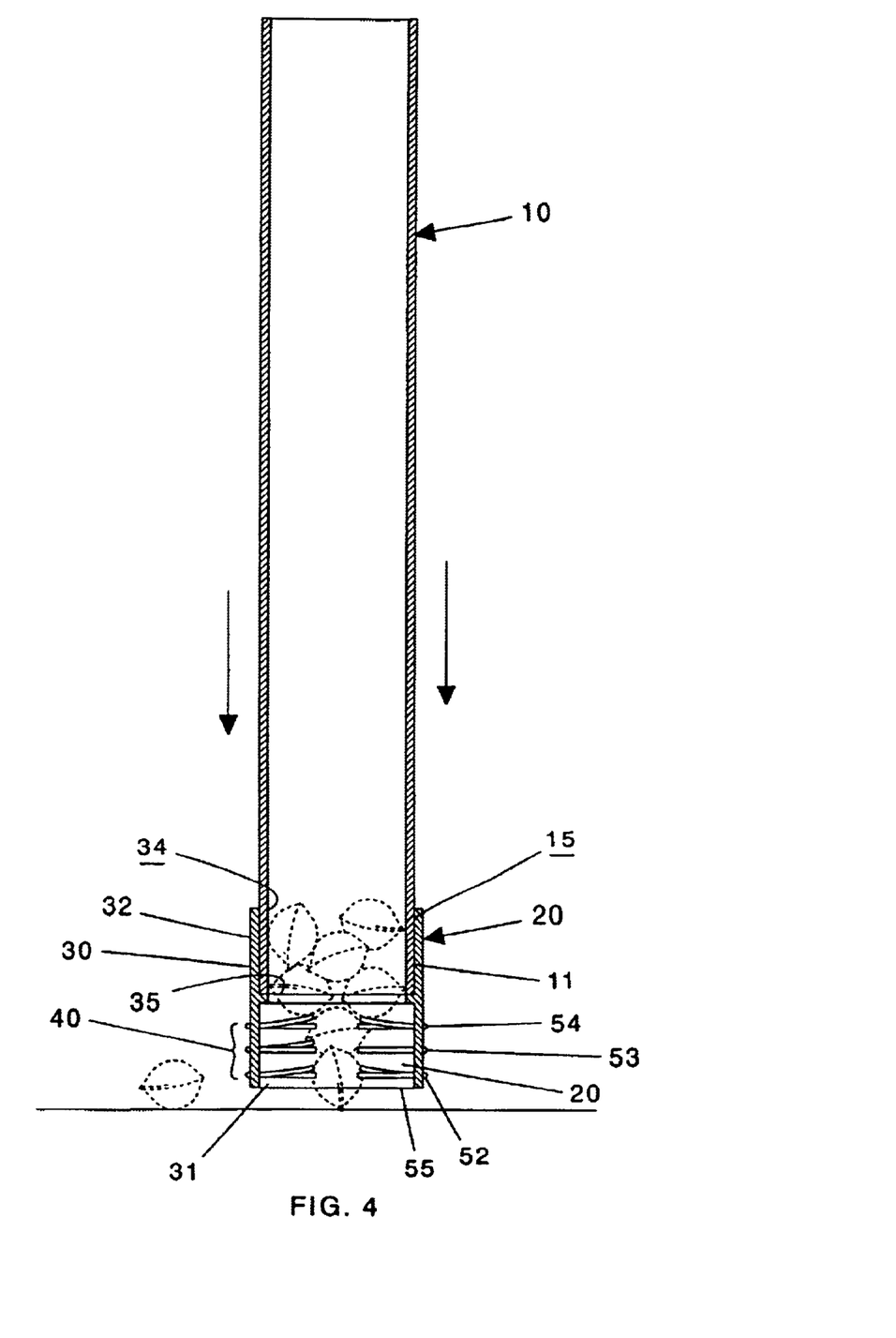
FIG. 4 is a lengthwise cutaway view of the embodiment of FIG. 1 showing a nut being retrieved with another nut moving from the passageway toward the housing where a plurality of nuts are stored. The nuts are shown in dotted lines.

Referring to FIG. 4, the housing (10) is attached to the retaining element (20). In a preferred embodiment, the housing (10) is telescopically fitted within the sleeve (30), such that the first end (11) of the housing (10) is received within the second end (32) of the sleeve (30). The inner surface (34) of the sleeve wall (33) is positioned adjacent to the exterior surface (15) of the housing (10) and an outer edge of the housing's first end (11) abuts the lip (35) on the interior surface (34) of the sleeve wall (33).

On the retaining element (20) the flexible member (40) is located nearer the first end (31) of the sleeve (30). It is positioned between the lip (35) and the outer edge of the sleeve's first end (31). Likewise, the holes (38) are nearer the first end (31) of the sleeve (30), as well. The resilient pieces (41) shown FIGS. 5A and 5B are positioned in the holes (38) extending through the sleeve wall (33). The legs (42) of each resilient piece (41) are held in a respective pair of corresponding holes (38). Inside the sleeve (30) each leg (42) cantilevers away from the inner surface (34) of the sleeve wall (33) to extend into the sleeve interior region (39), while the central portion (43) of each resilient piece (41) is located outside the sleeve (30) and lies adjacent to an outer surface (36) of the sleeve wall (30). In a preferred embodiment, the nonparallel disposition of each pair of legs (42) retains the respective resilient piece (41) in place within its respective holes (38).

Preferably, the distance between the outside row (52) and the inside row (54) of resilient pieces (41) generally corresponds with an average diameter of the nuts being retrieved wherein the diameter of the nut is about the same or smaller than the distance between the outside (52) and inside (54) rows. This distance defines both an effective width of the flexible member (40) and the length of the passageway (50). Consequently, the length of the passageway (50) is elongated.

The legs (42) of the resilient pieces (41) are unflexed when the passageway (50) is devoid of articles. When a nut is in the passageway (50), the legs (42) flex to encircle the nut. A force is exerted on the nut by the flexed legs (42) and holds the nut in the passageway (50). In order to hold the nuts in the passageway (50), a diameter of the passageway (50), when the legs (42) are unflexed, is preferably less than an average smallest diameter of the nuts being gathered when the legs (42) are unflexed.

Referring to FIG. 2, the sleeve wall (33) surrounds and defines the sleeve interior region (39) of the retaining element (32). The inner surface (34) defines the inside perimeter of the sleeve (30). Inside the sleeve (30), the lip (35) extends circumferentially around the inner surface (34) and is located between the first (31) and second (32) ends of the sleeve (10). The resilient pieces (41) are disposed circumferentially around the sleeve (30) in plurality of rows.

In a preferred embodiment, the sleeve (30) has three rows. The outside row (52) is positioned closest to an outer edge of the sleeve's first end (31), the inside row (54) is positioned closest to the sleeve's second end (32), and the middle row (53) is disposed between the outside (52) and inside (54) rows. The resilient pieces (41) are mounted in the holes (38) disposed in the sleeve wall (33). Each resilient piece (41) is held in a pair of holes (38) with each leg (42) engaging a corresponding hole (38). When the passageway (50) is devoid of articles, the two legs (42) of each resilient piece (41) are unflexed and generally disposed in a nonparallel position. This leg arrangement inhibits dislodging of the resilient pieces (41) from the holes (38) on the sleeve (30), therefore enabling the legs (42) to flex without significantly displacing the resilient piece (41) from the sleeve (30).

The legs (42) cantilever from the inner surface (34) of the sleeve wall (33), extending into the sleeve interior region (39). The free ends (44) of the legs (42) are suspended within the sleeve interior region (39) and form the perimeter of the passageway (50). Each of the legs (42) extends into the sleeve interior region (39) a distance that is approximately less than half the diameter of the sleeve (30).

The housing interior area (18) is confluent with the sleeve interior region (39). The passageway (50) is contained in the sleeve (30) and circumscribes a portion of the sleeve interior region (39). Preferably, the passageway (50) is coaxial with the sleeve wall (33) and extends inclusively between the outside (52) and inside (54) rows of the flexible member (40). The passageway (50) is deformable and changes shape as the legs (42) flex and bend. By flexing and bending, the legs accommodate the size and shape of each nut as it is pressed through the passageway (50). Hence, the passageway (50) conforms to the general shape of each retrieved nut.

In the retrieving position, the retaining element (20) is disposed below the housing (10) of the device (1). When retrieving nuts, the device (1) is oriented in the retrieving position.

In a preferred retrieving position, the retaining element (20) is directly beneath the housing (10) with a longitudinal axis of the device (1) extending generally perpendicular to the ground or surface on which the nuts are located. In the dispensing position, the device (1) is oriented with the housing (10) disposed below the retaining element (20) so that the dispensing opening (17) is lower than the housing entry opening (16). The nuts are allowed to fall out of the housing (10) when the device (1) is moved to the dispensing position.

To retrieve nuts, the article retrieving device (1) is held in the retrieving position over a nut and then lowered. The nut is pressed into the retaining element (20) of the device (1) as shown in FIG. 4 and held in the passageway (50). As more nuts are pressed into the passageway, the nut(s) already in the passageway (50) is/are forced on through the passageway (50) and into the housing (10). The nuts are stored in the housing (10) until they are dispensed therefrom. To dispense the stored nuts, the device (1) is held in the dispensing position and the nuts fall out of the housing (10).

Specifically, with the article retrieving device (1) in the retrieving position, the entryway (55) of the retaining element (20) is approximately centered over a nut. The device (1) is subsequently lowered until the nut is inside of the sleeve (30) of the retaining element (20). The lowering action of the device (1) forces the nut into the passageway (50) inside the retaining element (20). As each nut enters the retaining element (20), it moves into contact with the outside row (52) of resilient pieces (41) comprised by the legs (42) of the flexible member (40). The legs (42) forming the outside row (52) bend and flex to receive the nut, thereby allowing the nut entry into the passageway (50). As the nut is pressed farther into the passageway (50), it contacts and moves into the middle row (53) and finally the inside row (54) of the resilient pieces (41). Like the legs (42) of the outside row (52), the legs (42) of the middle (53) and inside (54) rows bend and flex to accommodate the nut in the passageway (50).

As additional nuts are pressed into the device (1), the preceding nuts are pushed linearly through the passageway (50) in the retaining element (20) and into the housing (10). It should be noted that each retrieved nut is securely held by the flexible member (20) within the passageway (50) until another nut is retrieved. However, the force exerted by the nut entering the passageway (50) on the nut held in the passageway (50) must be large enough to overcome the holding force exerted by the flexible member (40) on the nut held in the passageway (50) in order to push the latter through the retaining element (20). Therefore, in order to move the nuts through the retaining element (20) and into the housing (10), the downward force exerted on the device (1) for pushing the nut into the passageway (50) must be of sufficient magnitude to at least overcome the holding force exerted by the flexible member (20) on the nuts held therein.

In a preferred embodiment when the first end (31) of the sleeve (30) contacts the ground or surface, the nut encircled by the sleeve (30) is contacting at least two rows of the flexible member (40). When another nut is retrieved, its entry into the passageway (50) forces the previously retrieved nut farther through the passageway (50) and toward the housing (10). As more nut are retrieved, the previously retrieved nuts are forced beyond the passageway (50) and into the interior area (18) of the housing (10) where they can accumulate in storage.

Downward forces are created by the weight of the stored nuts on the flexible member (40) when the device is in the retrieving position. These downward forces are resisted by the resilient pieces (20). The inside row (54) primarily resists the weight of the stored nuts to deter these nuts from backing out of the device's entryway (55).

The nuts are removed from the device (1) by moving the article retrieving device (1) from the retrieving position to the dispensing position. The weight of the nuts will shift in a downward direction toward the second end (12) of the housing (10), and the nuts will pour from the housing interior area (18) via the dispensing opening (17). If desired, a shaking action can be applied to the device (1) to hasten the removal of the nuts.

The article retrieving device (1) of the present invention enables a user to maintain an erect posture while retrieving and dispensing nuts. Since the user does not have to bend and/or stoop to retrieve the nuts, the device (1) provides an easier and more efficient means for gathering nuts, thereby saving time and reducing harvesting costs.

The flexible member not only gathers the nuts, but also retains the nuts in the device during use. Consequently, there is no need for additional elements on the device to deter the stored nuts from backing out of the sleeve's entryway and the cost of manufacturing the device (1) can be reduced.

In addition, the device is versatile enough to retrieve various sized nuts as well as inhibit the collection of unwanted debris or trash that may be proximate to the nuts.

It should be appreciated that the article retrieving device is not limited to use for retrieving nuts. The device can also be used to retrieve other objects including as tennis balls, golf balls, baseballs or various kinds of fruit.

Although the present invention has been described in considerable detail with reference to certain preferred versions thereof, other versions are possible. Therefore, the spirit and scope of the appended claims should not be limited to the description of the preferred versions contained herein.

What is claimed is:

1. An article retrieving device comprising:
   a retaining element for gathering articles; and
   a housing for storing articles;
   said retaining element further comprises a sleeve attached to said housing and a flexible member attached to said sleeve;
   said sleeve comprises a sleeve interior region;
   said flexible member comprises a plurality of resilient pieces extending into said sleeve interior region, wherein said resilient pieces are arranged in a plurality of rows with each row extending circumferentially around the sleeve, and said rows are spaced apart a distance that extends along a length of the sleeve;
   a deformable passageway formed by said rows of resilient pieces and disposed within said sleeve interior region, wherein said passageway has an elongated length.

2. The article retrieving device of claim 1, wherein each of said resilient pieces includes at least one leg, said at least one leg having one free end and one attached end which is attached to said sleeve, wherein said legs are flexible and said free ends define the passageway.

3. The article retrieving device of claim 2, wherein said sleeve has a first end and a second end, said first end comprises an entryway and said second end is attached to the housing, said plurality of rows comprises an outside row, an inside row and a middle row, said outside row being disposed closest to said entryway, said inside row is farthest from said entryway, and said middle row is between said outside and inside rows.

4. The article retrieving device of claim 1, wherein each of said resilient pieces is U-shaped.

5. The article retrieving device of claim 2, wherein each of said free ends are disposed in said sleeve interior region and said free ends of the legs form said passageway.

6. The article retrieving device of claim 1, wherein said housing has a first end attached to said sleeve and a second end having a dispensing opening for removing articles from the device.

7. The article retrieving device of claim 1, wherein said sleeve interior region has a diameter, and said resilient pieces extend into the sleeve interior region a distance that is less than approximately half of said diameter of the sleeve interior region.

8. An article retrieving device comprising:
   a retaining element for gathering articles; and
   a housing for storing articles;
   said retaining element further comprises a sleeve with a sleeve interior region and a flexible member attached to said sleeve;
   said flexible member comprises a plurality of resilient pieces extending into said sleeve interior region, wherein said resilient pieces are arranged in at least one row extending circumferentially around the sleeve, and wherein said resilient pieces define a deformable passageway in said sleeve interior region;
   each of said resilient pieces is U-shaped and comprises a pair of flexible legs and a central portion; and each of the flexible legs of a respective resilient piece has a free end and an attached end, wherein said attached end is attached to said central portion and said free end is disposed within said sleeve interior region.

9. The article retrieving device of claim 8, wherein said at least one row comprises a plurality of rows, said rows spaced along a length of the sleeve.

10. The article retrieving device of claim 9, wherein said sleeve has a first end and a second end, said first end comprises an entryway and said second end is attached to the housing, said plurality of rows comprises an outside row, an inside row and a middle row disposed along said sleeve, said outside row being disposed closest to said entryway, said inside row is farthest from said entryway, and said middle row is between said outside and inside rows.

11. The article retrieving device of claim 8, wherein said housing has a first end attached to said sleeve and a second end having a dispensing opening for removing articles from the device.

12. The article retrieving device of claim 8, wherein said sleeve interior region has a diameter, and said resilient pieces extend into the sleeve interior region a distance that is less than approximately half of said diameter of the sleeve interior region.

13. The article retrieving device of claim 8, wherein said sleeve having an inner surface and an outer surface and a plurality of holes extending through said inner surface to said outer surface, wherein said each of said legs extends through a corresponding one of said holes.

14. The article retrieving device of claim 13, wherein said central portion is adjacent to the outer surface of said sleeve.

15. An article retrieving device comprising:
    a retaining element for gathering articles;
    means for storing articles;
    said retaining element comprises a sleeve and a plurality of silent pieces, said sleeve including a sleeve interior region having a diameter, and each resilient piece comprises a pair of legs and a central portion, wherein said resilient pieces are arranged in a plurality of rows around said sleeve; and
    each leg of said pair of legs having a free end and an attached end, wherein said attached ends are attached to said central portion, and each of said legs extends into the sleeve interior region a distance that is less than approximately half the diameter of the sleeve interior region.

16. The article retrieving device of claim 15, wherein each of said resilient pieces is U-shaped.

17. The article retrieving device of claim 15, wherein said sleeve having an inner surface and an outer surface and a plurality of holes extending through said inner surface to said outer surface, wherein said each of said legs extends through a corresponding one of said holes.

18. An article retrieving device for retrieving, storing and dispensing nuts, the article retrieving device comprises:
    a retaining element for gathering the articles into the device; and
    a housing for storing the retrieved articles;
    said housing is an elongated tube having first and second housing ends, a housing interior area and a dispensing opening, said dispensing opening is disposed at said second end of the housing;
    said retaining element comprises a sleeve and a flexible member;
    said sleeve comprises a sleeve wall having inner and outer surfaces, a sleeve interior region, first and second sleeve ends, and a lip;
    wherein said lip is disposed on said inner surface and extends circumferentially around said sleeve wall, the first end of the sleeve is an entryway for nuts entering the device and the second end of said sleeve is telescopically attached to the first end of said housing;
    a deformable passageway in said retaining element;
    a plurality of holes extending through said sleeve wall on the first end of said sleeve;
    said flexible member comprises a plurality of U-shaped resilient pieces, each of said resilient pieces includes a pair of legs and a central portion, wherein each said pair of legs is attached to a respective central portion, and each of said legs has a free end disposed in said sleeve interior region;
    wherein said resilient pieces are arranged in a plurality of rows extending around the sleeve, and said free ends define the perimeter of the passageway in said sleeve interior region; each of said legs extends into the sleeve interior region a distance that is approximately less than half of the diameter of the sleeve.

* * * * *

UNITED STATES PATENT AND TRADEMARK OFFICE
CERTIFICATE OF CORRECTION

PATENT NO.     : 6,619,022 B2
DATED          : September 16, 2003
INVENTOR(S)    : Edwards, Benny Kay It is certified that error appears in the above-identified patent and that said Letters Patent is hereby corrected as shown below:

<u>Column 9,</u>
Line 36, change "silent" to -- resilient --.

Signed and Sealed this

Seventeenth Day of February, 2004

JON W. DUDAS
*Acting Director of the United States Patent and Trademark Office*